Sept. 6, 1960
A. M. BRENNEKE
2,951,732
PISTON RING
Filed Feb. 27, 1959
2 Sheets-Sheet 1
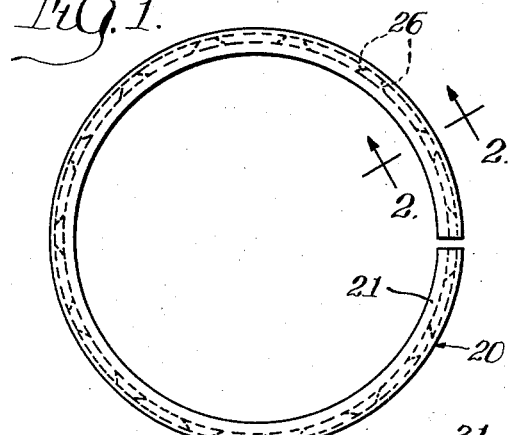
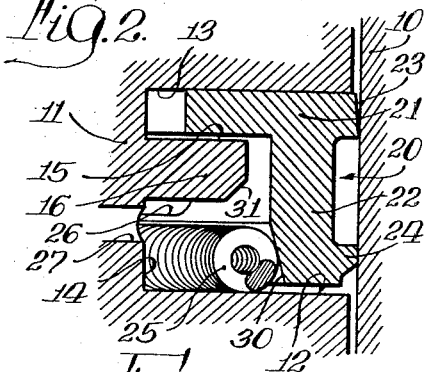
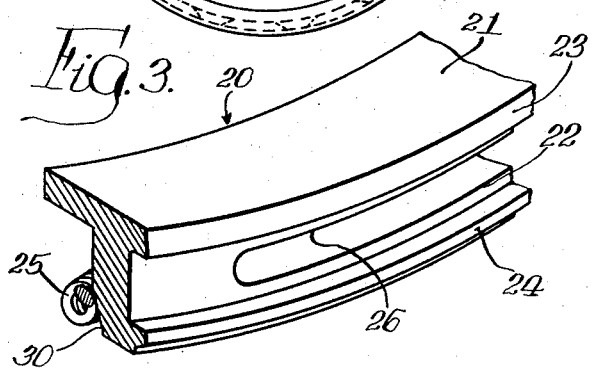
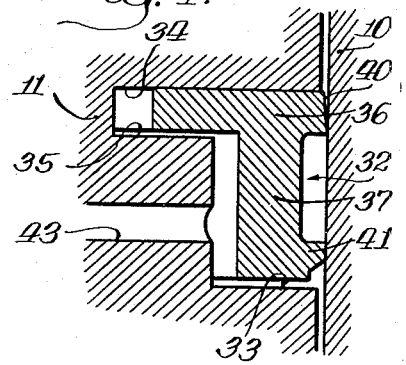
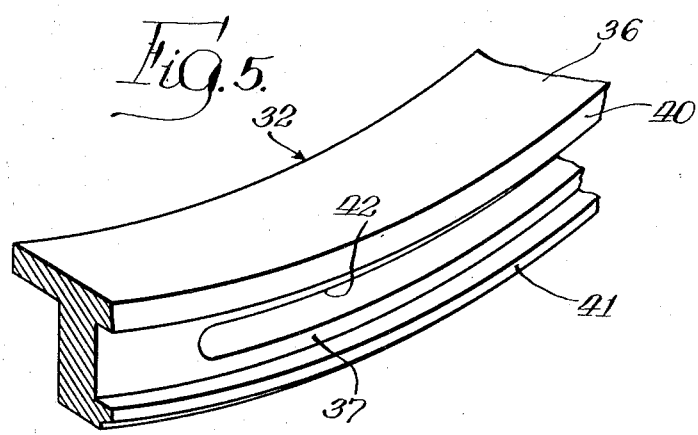
INVENTOR.
Arthur M. Brenneke,
BY
Davis, Lindsey, Hibben & Noyes
Attys.

Sept. 6, 1960     A. M. BRENNEKE     2,951,732
PISTON RING
Filed Feb. 27, 1959     2 Sheets-Sheet 2
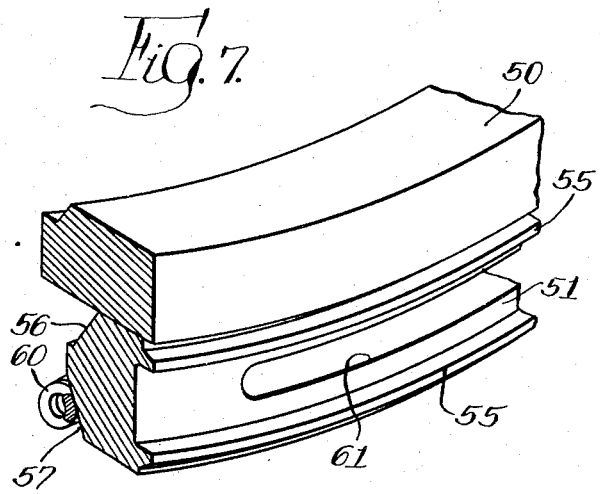
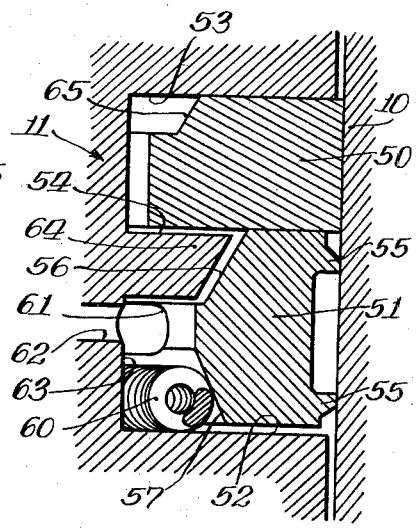
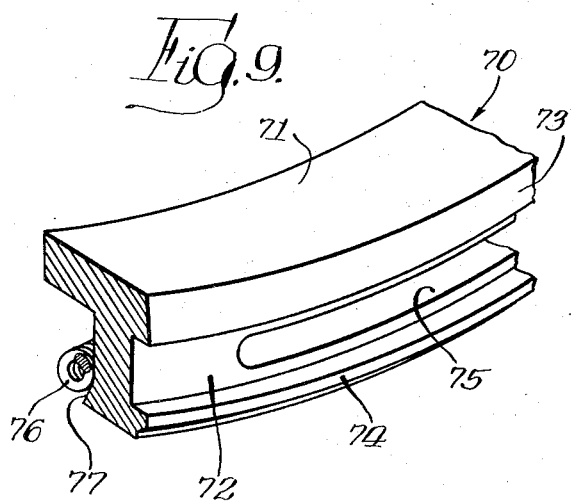
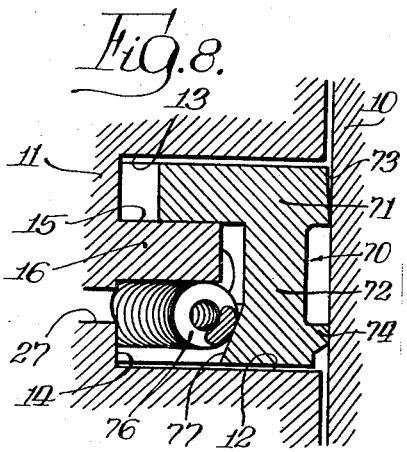
INVENTOR.
Arthur M. Brenneke,
BY
Davis, Lindsey, Hubben & Noyes
Attys.

United States Patent Office 2,951,732
Patented Sept. 6, 1960

2,951,732
PISTON RING

Arthur M. Brenneke, Hagerstown, Ind., assignor to Perfect Circle Corporation, Hagerstown, Ind., a corporation of Indiana Filed Feb. 27, 1959, Ser. No. 796,018

28 Claims. (Cl. 309—45)

The invention relates to a piston and ring construction for an internal combustion engine.

The general object of the invention is to provide a novel piston and ring construction of such axial dimension that the piston may be shorter axially than a piston of the type heretofore normally employed, and correspondingly, the engine block may be shorter axially of the cylinders.

More specifically, it is an object to provide a novel combined compression and oil ring adapted to be mounted in a single groove in a piston.

Another object is to provide a novel piston ring having a compression ring portion and an oil ring portion, with the two portions cooperating with each other in performing their respective functions.

A further object is to provide a novel piston ring having compression ring and oil ring portions integral with each other.

Still another object is to provide a novel piston ring having a compression ring portion and an oil ring portion separate from each other but adapted to be mounted side-by-side in a groove in the piston.

A still further object is to provide a novel piston ring having a compression ring portion and an oil ring portion and spring means tending to hold the ring in sealing relation with surfaces of the groove in the piston.

Other objects and advantages will become apparent from the following description taken in connection with the accompanying drawings in which:

Fig. 1 is an axial view of a combined compression and oil ring embodying the features of the invention.

Fig. 2 is an enlarged radial sectional view of the ring shown in Fig. 1, taken on the line 2—2 of Fig. 1, and illustrating it mounted in a groove in a piston.

Fig. 3 is a fragmentary perspective view of the ring shown in Figs. 1 and 2.

Fig. 4 is a sectional view, similar to Fig. 2, but showing a modified form of ring.

Fig. 5 is a fragmentary perspective view of the ring shown in Fig. 4.

Fig. 6 is a sectional view, similar to Figs. 2 and 4, but showing another modified form of ring and the piston in which it is mounted.

Fig. 7 is a fragmentary perspective view of the ring shown in Fig. 6.

Fig. 8 is a sectional view, similar to Figs. 2, 4 and 6, but showing still another modified form of ring and the piston in which it is mounted.

Fig. 9 is a fragmentary perspective view of the ring shown in Fig. 8.

In many present day internal combustion engines used for automotive purposes, as well as engines for other purposes, each piston may be provided with two compression rings and an oil ring, each mounted in its own groove in the piston. A predetermined portion of the length of the piston is therefore required for such rings, since to the sum of the groove widths must be added the widths of the lands between the grooves and the land above the upper groove. The length of the cylinders, and hence the height of the engine, is of course dependent upon the length of the pistons. Present day vehicles are designed to be as low as possible, and it is therefore desirable to reduce the height of the engine. It is also desirable to reduce such height in order to reduce the weight of the engine, as well as to provide more space under the hood of the vehicle for auxiliary equipment.

The present invention involves a combined compression and oil ring mounted in a single groove in the piston. Thus, the land, heretofore required between the oil ring and the lower compression ring, is eliminated so that the length of the piston may thereby be reduced. Consequently the overall height of the engine may be reduced.

A combined compression and oil ring embodying the features of the invention comprises generally a compression ring portion and an oil ring portion in side-by-side relation to each other in the single groove in the piston. The two portions may be integral with each other or may be separate members. The compression ring portion may have a taper face or a plain axially extending face. An expander spring may also constitute an element of the ring, the spring bearing outwardly on the oil ring portion. When the two portions are made integral with each other, the ring may have a tendency toward a so-called "reverse" twist, but such tendency may be opposed by the spring expander if the latter is used. If the two portions are made as separate members, the compression ring member may be formed in such manner as to tend to produce a normal twist, thereby tending to cause the face of the member to assume a position at a slight angle to the axis, similar to a taper face ring.

If an expander spring is used, the oil portion is provided with a bearing surface for the spring, which is shaped so that the spring has an axial component of force exerted on the ring as well as a radial component. In the case of a ring with the two portions integral, the axial component tends to force the compression ring portion either against the upper side of the groove or against an upwardly facing ledge provided in the groove in the piston, depending upon the angle of the bearing surface for the spring. With the two portions formed as separate members, the spring tends to force the oil ring member against the compression ring member and the latter against the upper side of the groove.

The compression ring portion projects radially inward beyond the oil ring portion in all forms shown, and the groove in the piston at its upper side is provided with an inwardly extending annular channel in its bottom to receive the compression ring portion, the channel thus providing an upwardly facing ledge which the inner part of the compression ring portion overlies. The compression ring portion thus forms a seal with the upper side of the groove when forced upwardly and a seal with the ledge when forced downwardly. The groove in the piston may also be provided with an inwardly extending channel in its lower side to receive the spring when used. To carry away oil scraped from the cylinder wall by the oil ring portion, the ring may be slotted and drain holes may be provided in the piston in the bottom of the groove.

In Figs. 1, 2 and 3, the embodiment of the invention is shown, and in Fig. 2 the ring is shown mounted in a groove in a piston and the latter mounted in a cylinder. Thus, the cylinder is fragmentarily shown at 10 while the piston is fragmentarily shown at 11. The piston 11 is provided with a groove indicated generally at 12. The groove 12 has an inwardly extending annular channel 13 at its upper side and, since this form of ring includes an expander spring, the groove also has an inwardly extending annular channel 14 at its lower side. The channel 13 provides an upwardly facing ledge 15. The two channels 13 and 14 thus form an annular rib 16 projecting outwardly in the groove, the upper side of which constitutes the ledge 15.

The ring, in this embodiment, is shown generally at 20 and comprises a compression ring portion 21 and an oil ring portion 22, the two portions being shown as integral with each other. The compression ring portion 21 extends radially inward beyond the oil ring portion 22 so that the ring has the shape of an inverted L. The compression ring portion 21, or the horizontal leg of the L, extends inwardly into the channel 13 and thus overlies the ledge 16, while the oil ring portion 22, or the vertical leg of the L, extends downwardly in the groove. The face of the compression ring portion may be either plain or tapered but in this embodiment is preferably tapered as shown at 23.

The oil ring portion 22 where it joins the compression ring portion 21 is spaced from the cylinder wall and at its lower part is provided with a cylinder-engaging oil scraping flange 24. The latter is thus axially spaced from the compression ring portion 21. To provide the desired outward pressure, particularly by the flange 24, an expander spring 25 forms part of the ring in this embodiment, the spring being shown as a coil spring bearing outwardly on the oil ring portion 22 and being located in the channel 14 at the lower side of the groove. For carrying away oil scraped from the cylinder wall by the flange 24, the oil ring portion 22 is provided with a plurality of radial slots 26 located between the flange 24 and the compression ring portion 21, the slots 26 carrying the oil to the inner part of the groove 12. To drain the oil from the groove, drain holes 27 may be provided in the piston, which in this instance extend inwardly from the channel 14. To prevent the expander spring 25 from interfering with free flow of oil, the oil ring portion 22 is provided with a surface 30 at its lower inner corner slanting downwardly and outwardly so that the spring tends to remain at the lower side of the groove. The lower outer corner of the rib 16 may be beveled as at 31 to facilitate the flow of oil from the slots 26 to the drain holes 27.

Because of the inverted L shape of the ring, it tends to have a reverse twist, that is, a twist in a clockwise direction as shown in Fig. 2. However, the effect of the expander spring 27 tends to overcome such twist. Thus, since the expander spring 27 bears outwardly on the oil ring portion, the spring exerts a force in opposition to its tendency to twist. Also, since the expander spring 27 bears against the slanting surface 30, it has a vertical or axial component of force tending to force the compression ring portion 21 into sealing engagement with the upper side of the groove. If the forces acting on the ring are such, during any portion of the engine cycle, that they shift the ring downwardly, the compression ring portion then is moved into sealing engagement with the ledge 15.

The combined compression and oil ring shown in Figs. 4 and 5 is substantially the same as the ring shown in Figs. 1, 2 and 3, except that the ring of Figs. 4 and 5 does not include an expander spring. Thus, the ring of Figs. 4 and 5, indicated generally at 32, is mounted in a groove 33 in the piston 11. The groove 33 at its bottom is provided with an inwardly extending annular channel 34 located at the upper side of the groove and forming an upwardly facing ledge 35. The ring 32 has generally the shape of an inverted L, as in the first-described form, and comprises a compression ring portion 36 and an oil ring portion 37. The compression ring portion 36 extends radially inward beyond the oil ring portion 37 and projects into the channel 34 so that it overlies the ledge 35. The face of the compression ring portion 36 may be tapered as at 40, and the oil ring portion 37 may be provided with a cylinder-engaging flange 41 axially spaced from the compression ring portion 36. The oil ring portion 37 may be provided with a plurality of slots 42 (see Fig. 5) for conducting oil scraped from the cylinder wall to the inner part of the groove, from which it is drained by drain holes 43 in the piston located below the ledge 35.

With this form of ring, no expander spring is utilized so that the ring bears outwardly under its own spring force. The inverted L shape of the ring provides a tendency to give the ring a reverse twist. The compression ring portion 36, however, will establish a sealing engagement of the portion 36 with the upper side of the groove 33 or with the ledge 35, depending on the forces acting on the ring during the various portions of the engine cycle.

In the modified form of ring shown in Figs. 6 and 7, many of the features of the form of Figs. 1, 2 and 3 are included but the major difference lies in the fact that the ring of Figs. 6 and 7 comprises compression and oil ring portions formed by separate members. Thus, the compression ring member is indicated at 50 and the oil ring member at 51. The members 50 and 51 are positioned side-by-side in a groove 52 in the piston. The compression ring member 50 projects radially inward beyond the oil ring member 51, and the two members together thus have an inverted L shape. The groove 52 at its upper side has a radially inwardly extending annular channel 53 forming an upwardly facing ledge 54 which the compression ring member 50 overlies. The compression ring member 50 may have a tapered face or a plain face, the latter being shown in the drawing.

The oil ring member 51 is preferably provided with a pair of axially spaced cylinder-engaging flanges 55. The member 51 at the upper part of its inner periphery is slanted upwardly and outwardly as at 56 to permit the ledge 54 to extend outwardly farther under the compression ring member 50. At the lower part of its inner periphery, the member 51 is slanted downwardly and outwardly to provide a surface 57 engageable by an expander spring 60 shown as a coil spring. The slanted surfaces 56 and 57 being generally the same but respectively at the upper and lower sides of the member 51 eliminate any inherent tendency in the member 51 to twist. The member 51 may also be provided with a plurality of oil conducting slots 61, and the piston is provided with drain holes 62 located in an inwardly extending annular channel 63 at the lower side of the groove. The channel 63 also receives the expander spring 60 which is urged toward the lower side of the channel 63 by its pressure against the slanted surface 57, the spring thus avoiding interference with the free flow of oil. The channels 53 and 63 thus form a rib 64 in the bottom of the groove 52, the rib 64 having the ledge 54 at its upper surface.

The compression ring member 50 is cut away at its upper inner corner as at 65 so that the member 50 tends to have a twist in a counterclockwise direction as viewed in Fig. 6 when compressed in the cylinder, so that the plain face of the member 50 tends to assume the position of a tapered face. The expander spring 60, because of its engagement with the slanted surface 57 of the oil ring member 51, exerts an axial component of force on the member 51, in addition to its radial component of force, and the oil ring member 51 thereby tends to be forced upwardly and to force the compression ring member 50 upwardly into sealing engagement with the upper side of the groove 52. If the forces acting on the compression ring member 50 at any part of the engine cycle overcome the upward forces, then the compression ring member engages the ledge 54 to effect a seal.

The modified form of ring shown in Figs. 8 and 9 is similar to that shown in Figs. 1, 2 and 3 but differs in the action of the expander spring. Thus, the ring of Figs. 8 and 9, indicated generally at 70, is mounted in the groove 12. The ring 70 has generally the shape of an inverted L, as in the first-described form, and comprises a compression ring portion 71, and an oil ring portion 72, the two portions being integral with each other. The compression ring portion 71 extends radially inward beyond the oil ring portion 72 and projects into the channel 13 so that it overlies the ledge 15. The face of the compression ring portion 71 may be tapered as at 73, and the oil ring portion 72 may be provided with a cylinder-engaging flange 74 axially spaced from the compression ring portion 71. The oil ring portion 72 may be provided with a plurality of slots 75 (see Fig. 9) for conducting oil scraped from the cylinder wall to the inner part of the groove, from which it is drained by the drain holes 27 in the piston below the rib 16.

This embodiment of the ring includes an expander spring 76 bearing outwardly against the oil ring portion 72. However, the expander spring 76 exerts a component of force which tends to urge the ring downwardly with the compression ring portion 71 in sealing engagement with the ledge 15. To this end, the oil ring portion 72 has an inner surface 77 which extends inwardly and downwardly and the spring bears against such surface. The rib 16 overlies the spring 76 to hold it in engagement with the surface 77 and to prevent the spring from riding upwardly.

From the foregoing description, it will be apparent that by providing a combined compression and oil ring mounted in a single groove in the piston, the latter may be shorter axially than the pistons heretofore normally used, and consequently the entire engine may be shorter axially of the cylinders. The respective portions of the ring properly perform their functions of sealing against loss of compression and controlling the oil in the cylinder and cooperate with each other in performing such functions.

I claim:

1. The combination of a piston having an annular piston ring groove with an inwardly extending annular channel in the bottom of the groove at the upper side thereof and providing an upwardly facing ledge, and a combined compression and oil ring mounted in said groove and comprising a cylinder-engaging compression ring portion and an oil ring portion, the compression ring portion projecting into said channel and overlying said ledge, said oil ring portion having a cylinder-engaging flange remote from said compression ring portion.

2. The combination of claim 1, in which said combined ring includes an expander spring mounted in said groove and bearing outwardly on said oil ring portion.

3. The combination of claim 1, in which said combined ring includes an expander spring mounted in said groove and tending to force both of said portions outwardly.

4. The combination of claim 2, in which said piston has an inwardly extending annular channel in the bottom of the groove at the lower side thereof to receive said expander spring.

5. The combination of claim 4, in which said ring has radial slots for conducting oil scraped from the cylinder wall by said oil ring portion to the inner portion of said groove, and said piston has apertures extending inwardly from said lower channel for draining oil therefrom.

6. The combination of claim 5, in which said apertures extend inwardly from the upper part of said lower channel, and said oil ring portion is shaped to urge said expander spring toward the lower side of said lower channel to permit free flow of oil to said apertures.

7. The combination of a piston having an annular piston ring groove having a radially extending surface at its upper side and an inwardly extending annular channel in the bottom of the groove at the upper side thereof and providing an upwardly facing ledge having a radially extending surface, and a combined compression and oil ring mounted in said groove and comprising a compression ring portion projecting into said channel overlying said ledge, an oil ring portion, and a spring bearing outwardly on said ring and also tending to urge said ring into sealing engagement with one of said radially extending surfaces.

8. The combination of claim 7, in which said oil ring portion has a surface at an angle to the axis against which said spring bears.

9. The combination of a piston having an annular piston ring groove with an annular rib projecting outwardly from the bottom of the groove intermediate the sides thereof and providing a pair of inwardly extending axially spaced annular channels, a combined compression and oil ring mounted in said groove and comprising a compression ring portion extending into the upper channel, and an expander spring extending into the lower channel and bearing outwardly on the ring.

10. The combination of a piston having an annular piston ring groove with an inwardly extending annular channel in the bottom of the groove at the upper side thereof and providing an upwardly facing ledge, and a combined compression and oil ring mounted in said groove and comprising a member of inverted L shape with the horizontal leg of the L extending into said channel and overlying said ledge, the vertical leg of the L having a cylinder-engaging flange adjacent the lower end thereof and remote from said compression ring member.

11. The combination of claim 10, in which an expander spring is mounted in said groove and bears outwardly on the vertical leg of the L.

12. The combination of claim 10, in which the vertical leg of the L has radial slots for conducting oil scraped from the cylinder wall to the inner portion of the groove.

13. The combination of a piston having an annular piston ring groove with an inwardly extending annular channel in the bottom of the groove at the upper side thereof and providing an upwardly facing ledge, and a combined compression and oil ring mounted in said groove and comprising a compression ring member and an oil ring member, the compression ring member extending into said channel and overlying said ledge.

14. The combination of claim 13, in which an expander spring is mounted in said groove and bears outwardly on the oil ring member.

15. The combination of claim 13, in which said oil ring member has radial slots for conducting oil scraped from the cylinder wall to the inner portion of the groove.

16. The combination of claim 13, in which said oil ring member has a pair of axially spaced cylinder-engaging flanges.

17. The combination of a piston having an annular piston ring groove with an inwardly extending annular channel in the bottom of the groove at the upper side thereof and providing an upwardly facing ledge, and a combined compression and oil ring mounted in said groove and comprising a compression ring portion projecting into said channel and overlying said ledge, an oil ring portion, and a spring bearing outwardly on said ring and tending to urge said compression ring portion into sealing engagement with said ledge.

18. The combination of claim 17, in which said portions are integral with each other, and said oil ring portion has an inner surface extending downwardly and inwardly, and said spring bears against said surface.

19. The combination of claim 18, in which said piston has a rib extending outwardly from the bottom of the groove and providing said ledge, and said rib overlies said spring to hold it in engagement with said inner surface of the oil ring portion.

20. A combined compression and oil ring adapted to be mounted in a groove in a piston and comprising a compression ring portion, and an oil ring portion, said portions having axially spaced cylinder-engaging faces and the compression ring portion projecting radially inward beyond the oil ring portion, the cylinder-engaging face on said oil ring portion being remote from said compression ring portion.

21. A combined compression and oil ring according to claim 20, having radial slots adjacent said oil ring portion to conduct oil scraped from the cylinder wall by said oil ring portion to the inner portion of the piston ring groove.

22. A combined compression and oil ring according to claim 20, having an expander spring bearing outwardly on the ring and having a component of force tending to urge the ring axially.

23. A combined compression and oil ring according to claim 20, said ring being of inverted L shape in radial cross-section with one leg extending radially inward and the other leg extending axially, and said ring having an expander spring bearing outwardly on the axially extending leg.

24. A combined compression and oil ring according to claim 20, in which said portions comprise a compression ring member and an oil ring member adapted to be positioned side-by-side in a piston ring groove.

25. A combined compression and oil ring according to claim 24, in which said oil ring member has a pair of axially spaced cylinder-engaging flanges.

26. A combined compression and oil ring according to claim 25, in which said oil ring member has radial slots located between said flanges for conducting oil scraped from the cylinder wall to the inner portion of said groove.

27. A combined compression and oil ring according to claim 20, in which said oil ring portion is beveled at its lower inner face, and an expander spring bears outwardly against the bevel, the latter being adapted to urge the spring toward the lower side of the piston ring groove.

28. A combined compression and oil ring according to claim 20, in which said oil ring portion has an inner surface extending inwardly and downwardly and an expander spring bears outwardly against said surface.

References Cited in the file of this patent

UNITED STATES PATENTS

| | | |
|---|---|---|
| 1,538,525 | Teetor | May 19, 1925 |
| 2,062,367 | Marien et al. | Dec. 1, 1936 |